United States Patent
Peng et al.

(10) Patent No.: US 10,834,775 B2
(45) Date of Patent: Nov. 10, 2020

(54) NETWORK ACCESS METHOD, ACCESS DEVICE, AND TERMINAL DEVICE

(71) Applicant: HUAWEI TECHNOLOGIES CO., LTD., Guangdong (CN)

(72) Inventors: Wenjie Peng, Shanghai (CN); Hongzhuo Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/281,815

(22) Filed: Feb. 21, 2019

(65) Prior Publication Data

US 2019/0182882 A1 Jun. 13, 2019

Related U.S. Application Data

(63) Continuation of application No. PCT/CN2017/098038, filed on Aug. 18, 2017.

(30) Foreign Application Priority Data

Aug. 22, 2016 (CN) .......................... 2016 1 0702579

(51) Int. Cl.
*H04W 76/16* (2018.01)
*H04W 48/08* (2009.01)
(Continued)

(52) U.S. Cl.
CPC ........... *H04W 76/16* (2018.02); *H04L 5/0094* (2013.01); *H04L 27/2607* (2013.01); *H04W 8/24* (2013.01);
(Continued)

(58) Field of Classification Search
None
See application file for complete search history.

(56) References Cited

U.S. PATENT DOCUMENTS

| 2005/0075129 | A1 | 4/2005 | Kuchibholta et al. | |
| 2006/0246899 | A1* | 11/2006 | Buckley | H04W 48/12 |
| | | | | 455/435.2 |

(Continued)

FOREIGN PATENT DOCUMENTS

| CN | 1761353 A | 4/2006 |
| CN | 101459937 A | 6/2009 |

(Continued)

OTHER PUBLICATIONS

R3-161132 Huawei, "Evolved LTE to connect to the new core", 3GPP TSG-RAN3 Meeting #92, Nanjing, China, May 23-27, 2016, total 4 pages.

(Continued)

*Primary Examiner* — Anh Vu H Ly (74) *Attorney, Agent, or Firm* — Leydig, Voit & Mayer, Ltd.

(57) ABSTRACT

This application provides a network access method, an access device, and a terminal device. The access device is connected to at least two different types of core networks. When the terminal device is to connect to a core network, the terminal device sends, to the access device, a first message used to indicate a type of the terminal device. The access device determines the type of the terminal device based on the first message, and determines, based on the type of the terminal device, a target core network to be connected by the terminal device, so that the access device accurately connects the terminal device to the target core network.

15 Claims, 6 Drawing Sheets (51) Int. Cl.
*H04W 76/27* (2018.01)
*H04L 5/00* (2006.01)
*H04L 27/26* (2006.01)
*H04W 8/24* (2009.01)
*H04W 72/04* (2009.01)

(52) U.S. Cl.
CPC ....... *H04W 48/08* (2013.01); *H04W 72/0446* (2013.01); *H04W 72/0453* (2013.01); *H04W 76/27* (2018.02); *H04L 5/0005* (2013.01)

(56) References Cited

U.S. PATENT DOCUMENTS

| | | | | |
|---|---|---|---|---|
| 2007/0004402 A1* | 1/2007 | Buckley | ................ | H04W 48/16 455/432.1 |
| 2007/0004405 A1* | 1/2007 | Buckley | ................ | H04W 48/18 455/434 |
| 2007/0268877 A1* | 11/2007 | Buckley | ................ | H04W 48/18 370/338 |
| 2010/0027468 A1* | 2/2010 | Rajadurai | ............ | H04W 48/12 370/328 |
| 2012/0044866 A1* | 2/2012 | Lu | ...................... | H04L 12/5691 370/328 |
| 2013/0003541 A1* | 1/2013 | Zakrzewski | .......... | H04W 48/18 370/230 |
| 2013/0044709 A1* | 2/2013 | Adjakple | .............. | H04W 76/15 370/329 |
| 2013/0182680 A1 | 7/2013 | Choi et al. | | |
| 2014/0086177 A1* | 3/2014 | Adjakple | .............. | H04W 12/08 370/329 |
| 2014/0204758 A1* | 7/2014 | Zhu | ...................... | H04W 48/18 370/235 |
| 2015/0127843 A1 | 5/2015 | Karaoguz et al. | | |
| 2016/0143057 A1* | 5/2016 | Li | ........................... | H04W 4/06 370/329 |
| 2016/0249278 A1* | 8/2016 | Qi | ........................ | H04W 48/14 |
| 2017/0311245 A1* | 10/2017 | Kuge | .................... | H04W 48/16 |
| 2018/0176900 A1* | 6/2018 | Rong | .................... | H04W 48/18 |
| 2018/0249318 A1* | 8/2018 | Ianev | .................... | H04W 76/14 |
| 2018/0324690 A1* | 11/2018 | Wang | .................... | H04W 48/14 |
| 2019/0014515 A1* | 1/2019 | Zee | ........................ | H04W 76/27 |
| 2019/0110323 A1* | 4/2019 | Wang | ...................... | H04W 8/04 |
| 2019/0159088 A1* | 5/2019 | Shi | ........................ | H04W 36/08 |
| 2019/0174554 A1* | 6/2019 | Deenoo | ................ | H04W 80/02 |
| 2019/0230621 A1* | 7/2019 | Dai | ...................... | H04W 36/00 |
| 2019/0261264 A1* | 8/2019 | Lou | ........................ | H04W 48/16 |
| 2020/0092198 A1* | 3/2020 | Faccin | .................. | H04W 76/16 |

FOREIGN PATENT DOCUMENTS

| | | |
|---|---|---|
| EP | 2205019 B1 | 12/2011 |
| EP | 2523505 A1 | 11/2012 |
| EP | 2768260 A1 | 8/2014 |

OTHER PUBLICATIONS

International Search Report dated Nov. 10, 2017 in corresponding International Patent Application No. PCT/CN2017/098038 (7 pages).
Written Opinion of the International Searching Authority dated Nov. 10, 2017 in corresponding International Patent Application No. PCT/CN2017/098038 (4 pages).
European Search Report dated Apr. 10, 2019 in corresponding European Patent Application No. 17842844.7 (15 pages).
International Search Report dated Nov. 10, 2017 in corresponding International Application No. PCT/CN2017/098038.
"Tight interworking of evolved LTE and NR," 3GPP TSG-RAN WG2 Meeting#95, Gothenburg, Sweden, R2-164957, XP051126620, pp. 1-4, 3rd Generation Partnership, Project, Valbonne, France (Aug. 22-26, 2016).

* cited by examiner

NETWORK ACCESS METHOD, ACCESS DEVICE, AND TERMINAL DEVICE

CROSS-REFERENCE TO RELATED APPLICATIONS

This application is a continuation of International Application No. PCT/CN2017/098038, filed on Aug. 18, 2017, which claims priority to Chinese Patent Application No. 201610702579.5, filed on Aug. 22, 2016. The disclosures of the aforementioned applications are hereby incorporated by reference in their entireties.

TECHNICAL FIELD

This application relates to communications technologies, and in particular, to a network access method, an access device, and a terminal device.

BACKGROUND

As wireless communications technologies continuously develop, a new radio access technology (New Radio Access Technology, NR for short) appears after a Long Term Evolution (Long Term Evolution, LTE for short) technology.

An NR system includes an NR station and an NR core network. Compared with an evolved NodeB (Evolved NodeB, eNB for short) in an LTE system, the NR station provides a different air interface, for example, a shorter transmission time interval (Transmission Time Interval, TTI for short) and a larger bandwidth. Compared with an evolved packet core (Evolved Packet Core, EPC for short) in the LTE system, the NR core network in the NR system is capable of supporting more service types. In the prior art, an LTE terminal device accesses the EPC by using the eNB, and an NR terminal device accesses the NR core network by using the NR station. However, due to problems such as network deployment costs and terminal device changing costs, smooth evolution from the existing LTE system to the NR system is required, that is, a scenario in which the LTE system and the NR system coexist may appear.

However, in the scenario in which the LTE system and the NR system coexist, an access device cannot determine, by using a prior-art method, to connect a terminal device to a core network of which system.

SUMMARY

This application provides a network access method, an access device, and a terminal device to resolve a prior-art problem that in a scenario in which an LTE system and an NR system coexist, the access device cannot determine to connect the terminal device to a core network of which system.

According to a first aspect, this application provides a network access method, including:

connecting, by an access device, to at least two different types of core networks, where different types of terminal devices have capabilities of accessing different types of core networks, when a terminal device is to connect to a core network, the terminal device sends, to the access device, a first message used to indicate a type of the terminal device, and the access device determines the type of the terminal device based on the first message, further determines the type of the terminal device based on the first message, and determines, based on the type of the terminal device, a target core network to be connected by the terminal device, so that in a scenario in which an LTE system and an NR system coexist, the access device accurately connects the terminal device to the target core network.

In a possible design, the first message is a preamble sequence; and determining, by the access device based on the first message, that the type of the terminal device is a first type includes:

determining, by the access device based on a correspondence between the preamble sequence and the first-type terminal device, that the type of the terminal device is the first type.

In a possible design, the first message is a preamble sequence. The preamble sequence includes first indication information, and the first indication information is used to indicate that the type of the terminal device is a first type.

In a possible design, the determining, by the access device based on a correspondence between the preamble sequence and a first-type terminal device, that the type of the terminal device is the first type includes:

determining, by the access device based on a time-frequency resource of the preamble sequence and a correspondence between the time-frequency resource and the first-type terminal device, that the type of the terminal device is the first type.

In a possible design, determining, by the access device based on the first message, that the type of the terminal device is a first type includes:

determining, by the access device based on a frame length, a subcarrier spacing, a cyclic prefix CP length, or a transmission time interval TTI length used to transmit the first message, that the type of the terminal device is the first type.

In a possible design, the first message is a radio resource control RRC connection request message, the RRC connection request message includes second indication information, and the second indication information is used to indicate the type of the terminal device.

In a possible design, the first message is an RRC connection setup complete message. The RRC connection setup complete message includes third indication information, and the third indication information is used to indicate that the type of the terminal device is a first type.

In a possible design, the first message is an RRC connection setup complete message. The RRC connection setup complete message includes a non-access stratum NAS message. The NAS message includes fourth indication information, and the fourth indication information is used to indicate that the type of the terminal device is a first type.

In a possible design, the first message is an RRC connection request message or an RRC connection setup complete message; and determining, by the access device based on the first message, that the type of the terminal device is a first type includes:

determining, by the access device based on a format of the RRC connection request message or the RRC connection setup complete message, that the type of the terminal device is the first type.

In a possible design, the first message is an RRC connection setup complete message; and determining, by the access device based on the first message, that the type of the terminal device is a first type includes:

determining, by the access device based on a format of a NAS message in the RRC connection setup complete message, that the type of the terminal device is the first type.

In a possible design, before the access device receives the first message sent by the terminal device, the method further includes:

sending, by the access device, capability indication information to the terminal device, where the capability indication information is used to indicate that the access device has a capability of accessing the first core network.

According to a second aspect, this application provides a network access method, including:

generating, by a terminal device, a first message; and sending, by the terminal device, the first message to an access device, where the first message is used to indicate that the terminal device is a first-type terminal device, the first-type terminal device has a capability of accessing a first core network, the access device is connected to at least two different types of core networks, and the at least two different types of core networks include the first core network.

In a possible design, before the generating, by a terminal device, a first message, the method further includes:

determining, by the terminal device, a format of the first message based on a target core network to be accessed.

In a possible design, before the sending, by the terminal device, the first message to an access device, the method further includes:

determining, by the terminal device, that the access device has a capability of accessing the first core network.

In a possible design, before the determining, by the terminal device, that the access device has a capability of accessing the first core network, the method further includes:

receiving, by the terminal device, a broadcast message, where the broadcast message includes capability indication information, and the capability indication information is used to indicate that the access device has the capability of accessing the first core network; or receiving, by the terminal device, random access response information, where the random access response information includes the capability indication information; or receiving, by the terminal device, a radio resource control RRC connection setup message, where the RRC connection setup message includes the capability indication information.

In a possible design, the first message is a preamble sequence; and the generating, by a terminal device, a first message includes:

determining, by the terminal device, the preamble sequence based on a correspondence between the preamble sequence and the first-type terminal device.

In a possible design, the first message is a preamble sequence. The preamble sequence includes first indication information, and the first indication information is used to indicate that a type of the terminal device is a first type.

In a possible design, the determining, by the terminal device, the preamble sequence based on a correspondence between the preamble sequence and the first-type terminal device includes:

determining, by the terminal device based on a correspondence between a time-frequency resource and the first-type terminal device, a time-frequency resource for sending the preamble sequence to the access device.

In a possible design, the sending, by the terminal device, the first message to an access device includes:

transmitting, by the terminal device, the first message based on a frame length, a subcarrier spacing, a cyclic prefix CP length, or a transmission time interval TTI length used to transmit the first message of the first-type terminal device.

In a possible design, the first message is a radio resource control RRC connection request message, the RRC connection request message includes second indication information, and the second indication information is used to indicate that a type of the terminal device is a first type.

In a possible design, the first message is an RRC connection setup complete message. The RRC connection setup complete message includes third indication information, and the third indication information is used to indicate that a type of the terminal device is a first type.

In a possible design, the first message is an RRC connection setup complete message. The RRC connection setup complete message includes a non-access stratum NAS message. The NAS message includes fourth indication information, and the fourth indication information is used to indicate that a type of the terminal device is a first type.

In a possible design, the first message is an RRC connection request message or an RRC connection setup complete message; and the generating, by a terminal device, a first message includes:

generating, by the terminal device, the first message based on a format of an RRC connection request message or an RRC connection setup complete message of the target core network to be accessed.

In a possible design, the first message is an RRC connection setup complete message; and the generating, by a terminal device, a first message includes:

generating, by the terminal device, the first message based on a format of a NAS message in an RRC connection setup complete message of the target core network to be accessed.

According to a third aspect, to implement the foregoing network access method in the first aspect, this application provides an access device. The access device has a function of implementing an access device behavior in the foregoing access method. The function may be implemented by hardware, or may be implemented by hardware by executing corresponding software. The hardware or the software includes one or more modules corresponding to the foregoing function.

In a possible implementation of the third aspect, the access device includes a plurality of function modules. The plurality of function modules are configured to implement any network access method in the first aspect, so that the access device determines a target core network to be connected by a terminal device. Therefore, in a scenario in which an LTE system and an NR system coexist, the access device accurately connects the terminal device to the target core network.

In a possible implementation of the third aspect, a structure of the access device includes a processor and a transceiver. The processor is configured to support the access device in performing a corresponding function in the foregoing network access method. The receiver or the transmitter is configured to support communication between the access device and both the terminal device and a core network, and send information or an instruction in the foregoing network access method to the terminal device or the core network. The access device may further include a memory. The memory is configured to couple to the processor, and the memory stores a program instruction and data that are necessary for the access device.

According to a fourth aspect, to implement the foregoing network access method in the first aspect, this application provides a terminal device. The terminal device has a function of implementing a terminal device behavior in the foregoing access method. The function may be implemented by hardware, or may be implemented by hardware by executing corresponding software. The hardware or the software includes one or more modules corresponding to the foregoing function.

In a possible implementation of the fourth aspect, the terminal device includes a plurality of function modules. The plurality of function modules are configured to implement any network access method in the second aspect, and send a message to an access device to indicate a type of the terminal device, so that the access device can determine, based on the type of the terminal device, a target core network to be connected by the terminal device. Therefore, in a scenario in which an LTE system and an NR system coexist, the access device accurately connects the terminal device to the target core network.

In a possible implementation of the fourth aspect, a structure of the terminal device includes a processor and a transceiver. The processor is configured to support the terminal device in performing a corresponding function in the foregoing network access method. The receiver or the transmitter is configured to support communication between the terminal device and the access device, and send information or an instruction in the foregoing network access method to the access device. The terminal device may further include a memory. The memory is configured to couple to the processor, and the memory stores a program instruction and data that are necessary for the access device.

DESCRIPTION OF EMBODIMENTS

In the specification, claims, and accompanying drawings of this application, the terms "first", "second", "third", "fourth", and so on (if existent) are intended to distinguish between similar objects but do not necessarily indicate a specific order or sequence. It should be understood that the data used in such a way are interchangeable in proper circumstances so that the embodiments of this application described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

As wireless communications technologies continuously develop, a wireless communications system also evolves continuously. To ensure a smooth transition from a system before evolution to a system after the evolution, this application provides an access device. The access device may be simultaneously connected to at least two different types of core networks, and may be simultaneously connected to terminal devices corresponding to the at least two different types of core networks. A terminal device corresponding to a core network of the system before the evolution may communicate only with the core network of the system before the evolution. A terminal device corresponding to a core network of the system after the evolution may communicate with a core network of the system after the evolution, and may communicate with the core network of the system before the evolution. The access device related to this application may be implemented by improving an existing access device in the system before the evolution, or may be a new access device, provided that the access device can be simultaneously connected to at least two different types of core networks, and can be simultaneously connected to terminal devices corresponding to the at least two different types of core networks. This application imposes no limitation thereto.

Figure 1:
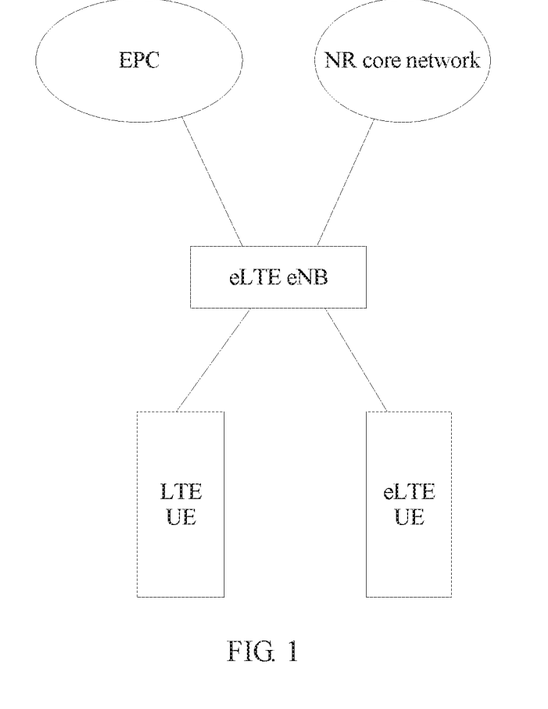
FIG. 1 is a schematic diagram of a network access system according to this application.

The following embodiments use a scenario shown in FIG. 1 as an example. FIG. 1 is a schematic diagram of a network access system according to this application. In FIG. 1, an LTE system is used as an example of the system before the evolution, and an NR system is used as an example of the system after the evolution. For example, an access device that can be connected to two different types of core networks and can be connected to terminal devices corresponding to the two different types of core networks is implemented by improving an LTE eNB, and is referred to as an evolved LTE eNB (Evolved Long Term Evolution Evolved NodeB, eLTE eNB for short). A core network of the LTE system is an EPC, and a core network of the NR system is referred to as an NR core network, a new core network (NewCore), a next generation core network (NG-Core), a 5G core network, or the like. For ease of description, the NR core network is used as an example in this application. A terminal device of the LTE system is referred to as LTE UE, and a terminal device that can communicate with the NR core network by using the eLTE eNB is referred to as eLTE UE. The eLTE eNB may be connected to the EPC and the NR core network, and may be connected to the LTE UE and the eLTE UE. The LTE UE may communicate with the EPC. The eLTE UE may communicate with the NR core network and may communicate with the EPC. When connected to the EPC, the eLTE UE can initiate only a service supported by the LTE system, and cannot initiate a new service supported by the NR core network.

Because the eLTE eNB may be simultaneously connected to the EPC and the NR core network, and may be connected to the LTE UE and the eLTE UE, when the LTE UE or the eLTE UE requests to establish a connection to a core network by using the eLTE eNB, the eLTE eNB needs to determine to connect the LTE UE or the eLTE UE to which core network. In this application, the eLTE eNB determines a type of a terminal device (that is, the terminal device is the LTE UE or the eLTE UE) that needs to establish a connection to a core network. Different types of terminal devices have capabilities of accessing different types of core networks, where the capabilities are used for determining core networks to be accessed. If the terminal device is the LTE UE, the terminal device is connected to the EPC. If the terminal device is the eLTE UE, the terminal device is connected to the NR core network.

The eLTE eNB may determine, in the following non-restrictive possible implementations, the type of the terminal device that needs to establish a connection to the core network.

In one possible implementation, when sending a message (referred to as a first message in this application) to the eLTE eNB, the terminal device adds indication information to the first message. The indication information is used to indicate the type of the terminal device that needs to be connected to the core network, so that the eLTE eNB determines the type of the terminal device based on the indication information, and further determines that the terminal device is to establish a connection to which core network.

In another possible implementation, when the terminal device establishes a connection to different core networks, the terminal device sends first messages in different formats to the eLTE eNB. The eLTE eNB determines the type of the terminal device based on the format of the first message, and further determines that the terminal device is to establish a connection to which core network.

In still another possible implementation, when the terminal device establishes a connection to different core networks, the terminal device sends first messages to the eLTE eNB by using different transmission resources or transmission parameters. The eLTE eNB determines the type of the terminal device based on the different transmission resources or transmission parameters, and further determines that the terminal device is to establish a connection to which core network.

Specific embodiments are used below to describe in detail the technical solutions of this application. The following several specific embodiments may be combined with each other, and a same or similar concept or process may not be described repeatedly in some embodiments.

Figure 2:
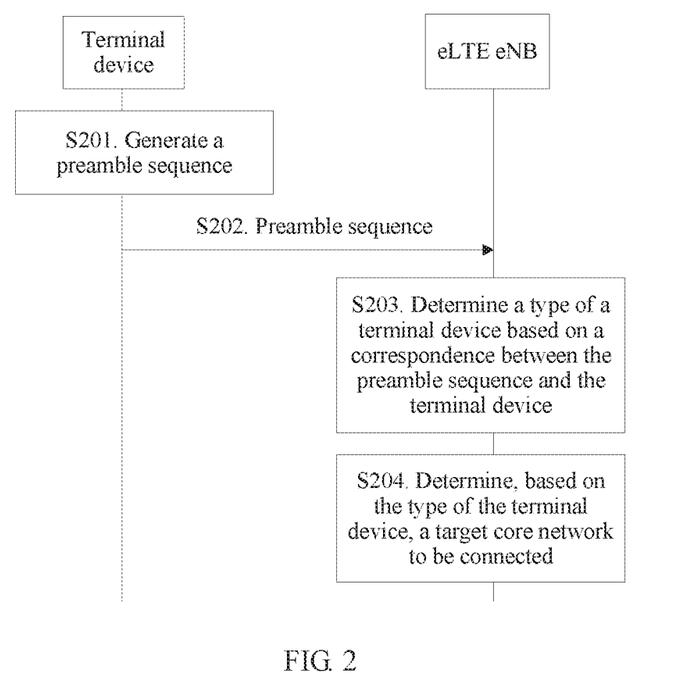
FIG. 2 is a schematic flowchart of Embodiment 1 of a network access method according to this application.

FIG. 2 is a schematic flowchart of Embodiment 1 of a network access method according to this application. As shown in FIG. 2, in this embodiment, a first message is a preamble sequence. Different preamble sequences are used to distinguish between different types of terminal devices, that is, some preamble sequences are only used for LTE UE, and some preamble sequences are only used for eLTE UE. An eLTE eNB learns in advance of a correspondence between a preamble sequence and a type of a terminal device. A specific process is shown in FIG. 2.

S201. A terminal device generates a preamble sequence.

For example, when the terminal device is LTE UE, a preamble sequence available to the LTE UE is used.

When the terminal device is eLTE UE, a preamble sequence available to the eLTE UE is used.

S202. The terminal device sends the preamble sequence to an eLTE eNB.

S203. The eLTE eNB determines a type of the terminal device based on a correspondence between the preamble sequence and the terminal device.

The correspondence between the preamble sequence and the terminal device includes a correspondence between the preamble sequence and the eLTE UE.

If the eLTE eNB determines that the preamble sequence is a preamble sequence corresponding to the eLTE UE, the eLTE eNB determines that the terminal device is the eLTE eNB.

If the eLTE eNB determines that the preamble sequence is a preamble sequence corresponding to the LTE UE, the eLTE eNB determines that the terminal device is the LTE eNB.

S204. The eLTE eNB determines, based on the type of the terminal device, a target core network to be connected.

If the terminal device is the LTE UE, it is determined that the target core network is an EPC. If the terminal device is the eLTE UE, it is determined that the target core network is an NR core network.

A subsequent process of an attach procedure is the same as that in the prior art, and details are not described herein.

In this embodiment, the eLTE eNB determines the type of the terminal device based on the correspondence between the preamble sequence and the terminal device, and the received preamble sequence sent by the terminal device, and further determines that the terminal device is to establish a connection to which core network. Therefore, in a scenario in which an LTE system and an NR system coexist, an access device accurately connects the terminal device to the target core network.

Figure 3:
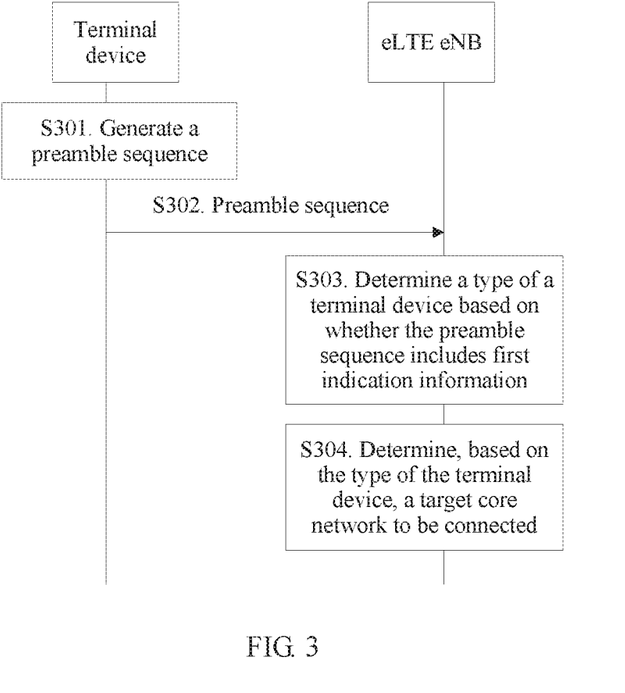
FIG. 3 is a schematic flowchart of Embodiment 2 of a network access method according to this application.

FIG. 3 is a schematic flowchart of Embodiment 2 of a network access method according to this application. As shown in FIG. 3, Embodiment 2 is the same as Embodiment 1 in that a first message is a preamble sequence, and a difference lies in that in Embodiment 2, preamble sequences available to eLTE UE and LTE UE are not distinguished from each other, and the eLTE UE adds first indication information to the preamble sequence to indicate that a type of a terminal device is the eLTE UE. Details are as follows:

S301. A terminal device generates a preamble sequence.

For example, when the terminal device is eLTE UE, the generated preamble sequence includes first indication information. The first indication information is used to indicate that a type of the terminal device is the eLTE UE.

When the terminal device is LTE UE, the generated preamble sequence does not include the first indication information.

S302. The terminal device sends the preamble sequence to an eLTE eNB.

S303. The eLTE eNB determines a type of the terminal device based on whether the preamble sequence includes first indication information.

If the preamble sequence sent by the terminal device includes the first indication information, it is determined that the terminal device is the eLTE UE.

If the preamble sequence sent by the terminal device does not include the first indication information, it is determined that the terminal device is the LTE UE.

S304. The eLTE eNB determines, based on the type of the terminal device, a target core network to be connected.

If the terminal device is the LTE UE, it is determined that the target core network is an EPC. If the terminal device is the eLTE UE, it is determined that the target core network is an NR core network.

A subsequent process of an attach procedure is the same as that in the prior art, and details are not described herein.

In this embodiment, the terminal device adds the first indication information to the preamble sequence to indicate that the type of the terminal device is the eLTE UE. The eLTE eNB determines the type of the terminal device based on the first indication information in the preamble sequence, and further determines that the terminal device is to establish a connection to which core network. Therefore, in a scenario in which an LTE system and an NR system coexist, an access device accurately connects the terminal device to the target core network.

Optionally, in another implementation of this application, types of terminal devices may be distinguished by using different transmission resources (for example, time-frequency resources) when first messages are transmitted. The first message is a preamble sequence. The eLTE eNB determines a type of a terminal device based on a time-frequency resource of the preamble sequence and a correspondence between the time-frequency resource and the type of the terminal device, and further determines that the terminal device is to establish a connection to which core network. Therefore, in a scenario in which an LTE system and an NR system coexist, an access device accurately connects the terminal device to a target core network.

Optionally, in another implementation of this application, different types of terminal devices may be distinguished by using a frame length, a subcarrier spacing, a cyclic prefix (Cyclic Prefix, CP for short) length, or a transmission time interval (Transmission Time Interval, TTI for short) length used to transmit a first message. Further, that the terminal device is to establish a connection to which core network is determined. Therefore, in a scenario in which an LTE system and an NR system coexist, an access device accurately connects the terminal device to a target core network.

In the foregoing embodiments, the method further includes the following: The eLTE eNB selects different RRC entities based on the type of the terminal device, and uses the different RRC entities to process an RRC connection request message, an RRC connection setup message, an RRC connection setup complete message, or the like. If it is determined that the type of the terminal device is the eLTE UE, the RRC connection request message, the RRC connection setup message, or the RRC connection setup complete message is processed by using an RRC entity corresponding to the NR core network. If it is determined that the type of the terminal device is the LTE UE, the RRC connection request message, the RRC connection setup message, or the RRC connection setup complete message is processed by using an RRC entity corresponding to the EPC.

Figure 4:
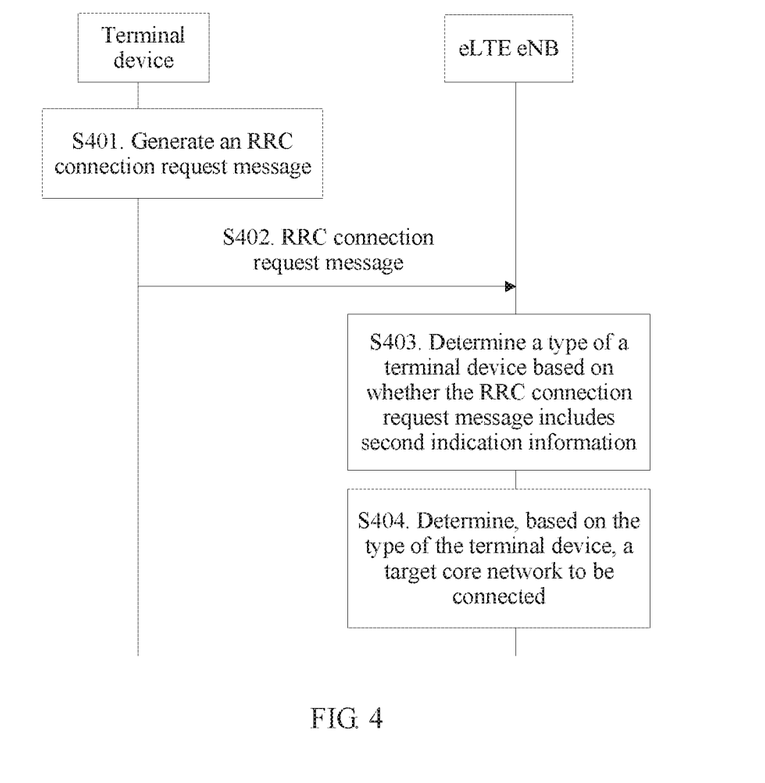
FIG. 4 is a schematic flowchart of Embodiment 5 of a network access method according to this application.

FIG. 4 is a schematic flowchart of Embodiment 5 of a network access method according to this application. As shown in FIG. 4, a first message in Embodiment 5 is an RRC connection request message, and eLTE UE adds second indication information to the RRC connection request message to indicate that a type of a terminal device is the eLTE UE. Details are specifically as follows:

S401. A terminal device generates an RRC connection request message.

For example, when the terminal device is eLTE UE, the generated RRC connection request message includes second indication information. The second indication information is used to indicate that a type of the terminal device is the eLTE UE.

When the terminal device is LTE UE, the generated RRC connection request message does not include the second indication information.

S402. The terminal device sends the RRC connection request message to an eLTE eNB.

S403. The eLTE eNB determines a type of the terminal device based on whether the RRC connection request message includes second indication information.

If the RRC connection request message sent by the terminal device includes the second indication information, it is determined that the terminal device is the eLTE UE.

If the RRC connection request message sent by the terminal device does not include the second indication information, it is determined that the terminal device is the LTE UE.

S404. The eLTE eNB determines, based on the type of the terminal device, a target core network to be connected.

If the terminal device is the LTE UE, it is determined that the target core network is an EPC. If the terminal device is the eLTE UE, it is determined that the target core network is an NR core network.

In an attach procedure, a process before the terminal device sends the RRC connection request message to the eLTE eNB, and a process after the eLTE eNB determines, based on the type of the terminal device, the target core network to be accessed are the same as those in the prior art. Details are not described herein.

In this embodiment, the terminal device adds the second indication information to the RRC connection request message to indicate that the type of the terminal device is the eLTE UE. The eLTE eNB determines the type of the terminal device based on the second indication information in the RRC connection request message, and further determines that the terminal device is to establish a connection to which core network. Therefore, in a scenario in which an LTE system and an NR system coexist, an access device accurately connects the terminal device to the target core network.

Figure 5:
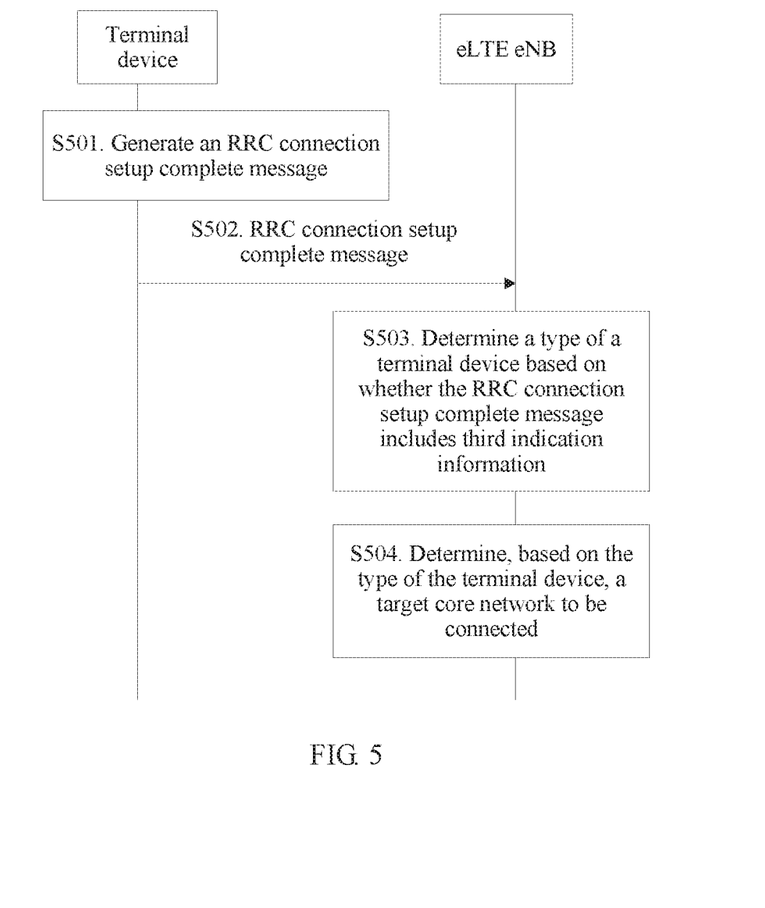
FIG. 5 is a schematic flowchart of Embodiment 6 of a network access method according to this application.

FIG. 5 is a schematic flowchart of Embodiment 6 of a network access method according to this application. Different from Embodiment 5, in Embodiment 6, third indication information is added to an RRC connection setup complete message to indicate that a type of a terminal device is eLTE UE, which is specifically as follows:

S501. A terminal device generates an RRC connection setup complete message.

For example, when the terminal device is eLTE UE, the generated RRC connection setup complete message includes third indication information. The third indication information is used to indicate that a type of the terminal device is the eLTE UE.

When the terminal device is LTE UE, the generated RRC connection setup complete message does not include the third indication information.

S502. The terminal device sends the RRC connection setup complete message to an eLTE eNB.

S503. The eLTE eNB determines a type of the terminal device based on whether the RRC connection setup complete message includes third indication information.

If the RRC connection setup complete message sent by the terminal device includes the third indication information, it is determined that the terminal device is the eLTE UE.

If the RRC connection setup complete message sent by the terminal device does not include the third indication information, it is determined that the terminal device is the LTE UE.

S504. The eLTE eNB determines, based on the type of the terminal device, a target core network to be accessed.

If the terminal device is the LTE UE, it is determined that the target core network is an EPC. If the terminal device is the eLTE UE, it is determined that the target core network is an NR core network.

The eLTE eNB processes the RRC connection setup complete message by using different RRC entities, and sends an initial UE message to a core network.

In an attach procedure, a process before the terminal device sends the RRC connection setup complete message to the eLTE eNB, and a process after the eLTE eNB determines, based on the type of the terminal device, the target core network to be accessed are the same as those in the prior art. Details are not described herein.

In this embodiment, the terminal device adds the third indication information to the RRC connection setup complete message to indicate that the type of the terminal device is the eLTE UE. The eLTE eNB determines the type of the terminal device based on the third indication information in the RRC connection setup complete message, and further determines that the terminal device is to establish a connection to which core network. Therefore, in a scenario in which an LTE system and an NR system coexist, an access device accurately connects the terminal device to the target core network.

Optionally, in another implementation of this application, a first message may be an RRC connection setup complete message, and fourth indication information used to indicate a type of a terminal device is carried in a NAS message of the RRC connection setup complete message.

Optionally, in another implementation of this application, different formats of RRC connection request messages may be used to distinguish between types of terminal devices. Alternatively, different formats of RRC setup complete messages are used to distinguish between types of terminal devices. Alternatively, different formats of NAS messages in RRC setup complete messages are used to distinguish between types of terminal devices.

In the foregoing embodiments, before the eLTE eNB receives the first message sent by the terminal device, the method may further include the following: The eLTE eNB indicates to the terminal device that the eLTE eNB has a capability of accessing different core networks, which is specifically as follows:

The eLTE eNB sends capability indication information to the terminal device.

The capability indication information is used to indicate that the eLTE eNB has a capability of accessing the NR core network.

Specifically, the eLTE eNB may send the capability indication information to the terminal device in the following non-restrictive manners.

One possible implementation is:

to send a broadcast message, and the broadcast message includes the capability indication information.

Another possible implementation is:

to send random access response information to the terminal device, and the random access response information includes the capability indication information.

Still another possible implementation is:

to send an RRC connection setup message to the terminal device, and the RRC connection setup message includes the capability indication information.

In this embodiment, the eLTE eNB sends the capability indication information to the terminal device, so that the terminal device learns that the eLTE eNB has the capability of accessing the NR core network and the EPC, and determines to indicate the type of the terminal device by using the first message. In this way, the eLTE eNB determines that the terminal device is to establish a connection to which core network. Therefore, in a scenario in which an LTE system and an NR system coexist, an access device accurately connects the terminal device to the target core network.

Figure 6:
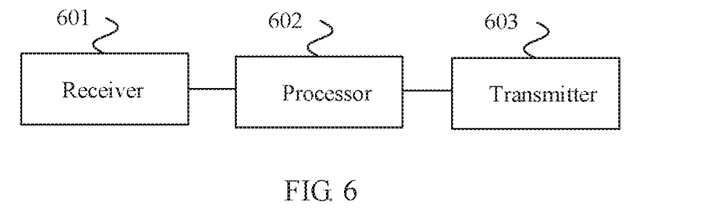
FIG. 6 is a schematic structural diagram of an embodiment of an access device according to this application.

FIG. 6 is a schematic structural diagram of an embodiment of an access device according to this application. As shown in FIG. 6, the access device in this embodiment includes a receiver 601 and a processor 602. The receiver 601 is configured to receive a first message from a terminal device, and the first message is used to indicate that the terminal device is a first-type terminal device. The first-type terminal device has a capability of accessing a first core network. The access device is connected to at least two different types of core networks. The at least two different types of core networks include the first core network. The processor 602 is configured to determine, based on the first message, that a type of the terminal device is a first type. The processor 602 is further configured to determine, based on the type of the terminal device, that a target core network to be accessed by the terminal device is the first core network.

In the foregoing embodiment, the first message is a preamble sequence; and the processor 602 is specifically configured to determine, based on a correspondence between the preamble sequence and the first-type terminal device, that the type of the terminal device is the first type.

In the foregoing embodiment, the first message is a preamble sequence. The preamble sequence includes first indication information, and the first indication information is used to indicate that the type of the terminal device is the first type.

In the foregoing embodiment, the processor 602 is specifically configured to determine, based on a time-frequency resource of the preamble sequence and a correspondence between the time-frequency resource and the first-type terminal device, that the type of the terminal device is the first type.

In the foregoing embodiment, the processor 602 is specifically configured to determine, based on a frame length, a subcarrier spacing, a cyclic prefix CP length, or a transmission time interval TTI length used to transmit the first message, that the type of the terminal device is the first type.

In the foregoing embodiment, the first message is a radio resource control RRC connection request message, the RRC connection request message includes second indication information, and the second indication information is used to indicate the type of the terminal device.

In the foregoing embodiment, the first message is an RRC connection setup complete message. The RRC connection setup complete message includes third indication information, and the third indication information is used to indicate that the type of the terminal device is the first type.

In the foregoing embodiment, the first message is an RRC connection setup complete message. The RRC connection setup complete message includes a non-access stratum NAS message. The NAS message includes fourth indication information, and the fourth indication information is used to indicate that the type of the terminal device is the first type.

In the foregoing embodiment, the first message is an RRC connection request message or an RRC connection setup complete message; and the processor 602 is specifically configured to determine, based on a format of the RRC connection request message or the RRC connection setup complete message, that the type of the terminal device is the first type.

In the foregoing embodiment, the first message is an RRC connection setup complete message; and the processor 602 is specifically configured to determine, based on a format of a NAS message in the RRC connection setup complete message, that the type of the terminal device is the first type.

In the foregoing embodiment, the access device further includes:

a transmitter 603, configured to send capability indication information to the terminal device, where the capability indication information is used to indicate that the access device has a capability of accessing the first core network.

In the access device in the embodiment shown in FIG. 6, the processor is configured to support the access device in performing a corresponding function in the foregoing network access method. The receiver or the transmitter is configured to support communication between the access device and both the terminal device and the core network, and send information or an instruction in the foregoing network access method to the terminal device or the core network. An implementation principle and a technical effect of the receiver or the transmitter are similar to those in the method embodiment, and are not described herein.

Figure 7:
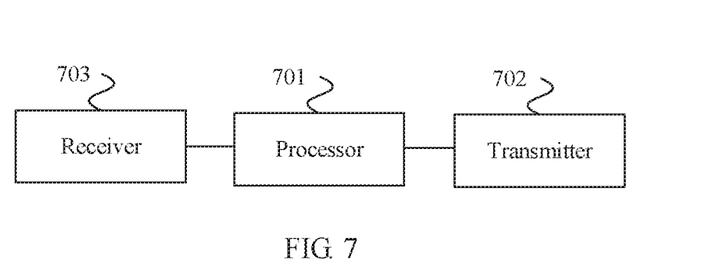
FIG. 7 is a schematic structural diagram of an embodiment of a terminal device according to this application.

FIG. 7 is a schematic structural diagram of an embodiment of a terminal device according to this application. The terminal device in this embodiment includes a processor 701 and a transmitter 702. The processor 701 is configured to generate a first message. The transmitter 702 is configured to send the first message to an access device. The first message is used to indicate that the terminal device is a first-type terminal device. The first-type terminal device has a capability of accessing a first core network. The access device is connected to at least two different types of core networks, and the at least two different types of core networks include the first core network.

In the foregoing embodiment, the processor 701 is further configured to determine a format of the first message based on a target core network to be accessed.

In the foregoing embodiment, the processor 701 is further configured to determine that the access device has a capacity of accessing the first core network.

In the foregoing embodiment, the terminal device further includes:

a receiver 703, configured to receive a broadcast message, where the broadcast message includes capability indication information, and the capability indication information is used to indicate that the access device has the capability of accessing the first core network; or a receiver 703, configured to receive random access response information, where the random access response information includes capability indication information; or a receiver 703, configured to receive a radio resource control RRC connection setup message, where the RRC connection setup message includes capability indication information.

In the foregoing embodiment, the first message is a preamble sequence; and the processor 701 is specifically configured to determine the preamble sequence based on a correspondence between the preamble sequence and the first-type terminal device.

In the foregoing embodiment, the first message is a preamble sequence. The preamble sequence includes first indication information, and the first indication information is used to indicate that a type of the terminal device is a first type.

In the foregoing embodiment, the processor 701 is specifically configured to determine, based on a correspondence between a time-frequency resource and the first-type terminal device, a time-frequency resource for sending the preamble sequence to the access device.

In the foregoing embodiment, the transmitter 702 is specifically configured to transmit the first message based on a frame length, a subcarrier spacing, a cyclic prefix CP length, or a transmission time interval TTI length used to transmit the first message of the first-type terminal device.

In the foregoing embodiment, the first message is a radio resource control RRC connection request message, the RRC connection request message includes second indication information, and the second indication information is used to indicate that a type of the terminal device is a first type.

In the foregoing embodiment, the first message is an RRC connection setup complete message. The RRC connection setup complete message includes third indication information, and the third indication information is used to indicate that a type of the terminal device is a first type.

In the foregoing embodiment, the first message is an RRC connection setup complete message. The RRC connection setup complete message includes a non-access stratum NAS message. The NAS message includes fourth indication information, and the fourth indication information is used to indicate that a type of the terminal device is a first type.

In the foregoing embodiment, the first message is an RRC connection request message or an RRC connection setup complete message; and the processor 701 is specifically configured to generate the first message based on a format of an RRC connection request message or an RRC connection setup complete message of the target core network to be accessed.

In the foregoing embodiment, the first message is an RRC connection setup complete message; and the processor 701 is specifically configured to generate the first message based on a format of a NAS message in an RRC connection setup complete message of the target core network to be accessed.

In the access device in the embodiment shown in FIG. 7, the processor is configured to support the terminal device in performing a corresponding function in the foregoing network access method. The receiver or the transmitter is configured to support communication between the terminal device and the access device, and send information or an instruction in the foregoing network access method to the access device. An implementation principle and a technical effect of the receiver or the transmitter are similar to those in the method embodiment, and are not described herein.

To implement the foregoing network access method, this application further provides an access device. The access device has a function of implementing an access device behavior in the foregoing access method. The function may be implemented by hardware, or may be implemented by hardware by executing corresponding software. The hardware or the software includes one or more modules corresponding to the foregoing function.

The access device includes a plurality of function modules. The plurality of function modules are configured to implement any network access method in the first aspect, so that the access device determines a target core network to be connected by a terminal device. Therefore, in a scenario in which an LTE system and an NR system coexist, the access device accurately connects the terminal device to the target core network. An implementation principle and a technical effect of the access device are similar to those in the method embodiment, and are not described herein.

To implement the foregoing network access method in the first aspect, this application provides a terminal device. The terminal device has a function of implementing a terminal device behavior in the foregoing access method. The function may be implemented by hardware, or may be implemented by hardware by executing corresponding software. The hardware or the software includes one or more modules corresponding to the foregoing function.

The access device includes a plurality of function modules. The plurality of function modules are configured to implement any network access method in the second aspect, and send a message to an access device to indicate a type of the terminal device, so that the access device can determine, based on the type of the terminal device, a target core network to be connected by the terminal device. Therefore, in a scenario in which an LTE system and an NR system coexist, the access device accurately connects the terminal device to the target core network. An implementation principle and a technical effect of the terminal device are similar to those in the method embodiment, and are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

In accordance with an example of the invention, this application further provides the following embodiments:

Embodiment 1

An access device, comprising:
a receiver, configured to receive a first message from a terminal device, wherein the first message is used to indicate that the terminal device is a first-type terminal device, the first-type terminal device has a capability of accessing a first core network, the access device is connected to at least two different types of core networks, and the at least two different types of core networks comprise the first core network; and
a processor, configured to determine, based on the first message, that a type of the terminal device is a first type, wherein
the processor is further configured to determine, based on the type of the terminal device, that a target core network to be accessed by the terminal device is the first core network, wherein the first message is a radio resource control RRC connection request message, the RRC connection request message comprises second indication information, and the second indication information is used to indicate the type of the terminal device.

Embodiment 2

An access device, comprising:
a receiver, configured to receive a first message from a terminal device, wherein the first message is used to indicate that the terminal device is a first-type terminal device, the first-type terminal device has a capability of accessing a first core network, the access device is connected to at least two different types of core networks, and the at least two different types of core networks comprise the first core network; and
a processor, configured to determine, based on the first message, that a type of the terminal device is a first type, wherein
the processor is further configured to determine, based on the type of the terminal device, that a target core network to be accessed by the terminal device is the first core network, wherein the first message is an RRC connection setup complete message, the RRC connection setup complete message comprises third indication information, and the third indication information is used to indicate that the type of the terminal device is the first type.

Embodiment 3

An access device, comprising:
a receiver, configured to receive a first message from a terminal device, wherein the first message is used to indicate that the terminal device is a first-type terminal device, the first-type terminal device has a capability of accessing a first core network, the access device is connected to at least two different types of core networks, and the at least two different types of core networks comprise the first core network; and
a processor, configured to determine, based on the first message, that a type of the terminal device is a first type, wherein the processor is further configured to determine, based on the type of the terminal device, that a target core network to be accessed by the terminal device is the first core network, wherein the first message is an RRC connection setup complete message, the RRC connection setup complete message comprises a non-access stratum NAS message, the NAS message comprises fourth indication information, and the fourth indication information is used to indicate that the type of the terminal device is the first type.

Embodiment 4

An access device, comprising:
a receiver, configured to receive a first message from a terminal device, wherein the first message is used to indicate that the terminal device is a first-type terminal device, the first-type terminal device has a capability of accessing a first core network, the access device is connected to at least two different types of core networks, and the at least two different types of core networks comprise the first core network; and
a processor, configured to determine, based on the first message, that a type of the terminal device is a first type, wherein the processor is further configured to determine, based on the type of the terminal device, that a target core network to be accessed by the terminal device is the first core network, wherein the first message is an RRC connection request message or an RRC connection setup complete message; and the processor is configured to determine, based on a format of the RRC connection request message or the RRC connection setup complete message, that the type of the terminal device is the first type.

Embodiment 5

An access device, comprising:
a receiver, configured to receive a first message from a terminal device, wherein the first message is used to indicate that the terminal device is a first-type terminal device, the first-type terminal device has a capability of accessing a first core network, the access device is connected to at least two different types of core networks, and the at least two different types of core networks comprise the first core network; and
a processor, configured to determine, based on the first message, that a type of the terminal device is a first type, wherein the processor is further configured to determine, based on the type of the terminal device, that a target core network to be accessed by the terminal device is the first core network, wherein the first message is an RRC connection setup complete message; and the processor is configured to determine, based on a format of a NAS message in the RRC connection setup complete message, that the type of the terminal device is the first type.

Embodiment 6

An access device according to embodiment 4 or embodiment 5, further comprising: a transmitter, configured to send capability indication information to the terminal device, wherein the capability indication information is used to indicate that the access device has a capability of accessing the first core network.

Embodiment 7

A terminal device, comprising:
a processor, configured to generate a first message; and
a transmitter, configured to send the first message to an access device, wherein the first message is used to indicate that the terminal device is a first-type terminal device, the first-type terminal device has a capability of accessing a first core network, the access device is connected to at least two different types of core networks, and the at least two different types of core networks comprise the first core network.

Embodiment 8

The terminal device according to Embodiment 7, wherein the processor is further configured to determine a format of the first message based on a target core network to be assessed.

Embodiment 9

The terminal device according to Embodiment 7 or Embodiment 8, wherein the processor is further configured to determine that the access device has a capability of accessing the first core network.

Embodiment 10

The terminal device according to Embodiment 9, further comprising:
a receiver, configured to receive a broadcast message, wherein the broadcast message comprises capability indication information, and the capability indication information is used to indicate that the access device has the capability of accessing the first core network; or
the receiver, configured to receive random access response information, wherein the random access response information comprises the capability indication information; or
the receiver, configured to receive a radio resource control RRC connection setup message, wherein the RRC connection setup message comprises the capability indication information.

Finally, it should be noted that the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method of network access, comprising:
receiving, by an access device from a terminal device, a first message used to indicate that the terminal device is a first-type terminal device, the first-type terminal device has a capability of accessing a first core network, the access device is connected to two different types of core networks, the two different types of core networks are a New Radio Access Technology (NR) system and a Long Term Evolution (LTE) system and the two different types of core networks comprise the first core network;
determining, by the access device based on the first message, that a type of the terminal device is the first type; and
determining, by the access device based on the type of the terminal device, that a target core network to be accessed by the terminal device is the first core network so that when in which the LTE system and the NR system coexist, the access device accurately connects the terminal device to the respective target core network,
wherein the first message is a preamble sequence, and the determining, by the access device based on the first message, that a type of the terminal device is a first type comprises:
determining, by the access device based on a correspondence between the preamble sequence and the first-type terminal device, that the type of the terminal device is the first type.

2. The method according to claim 1, wherein the determining, by the access device based on the first message, that a type of the terminal device is a first type comprises:
determining, by the access device based on a frame length, a subcarrier spacing, a cyclic prefix CP length, or a transmission time interval TTI length used to transmit the first message, that the type of the terminal device is the first type.

3. The method according to claim 1, wherein the first message is a radio resource control RRC connection request message, the RRC connection request message comprises second indication information, and the second indication information is used to indicate the type of the terminal device.

4. The method according to claim 1, wherein the first message is an RRC connection setup complete message, the RRC connection setup complete message comprises third indication information, and the third indication information is used to indicate that the type of the terminal device is the first type.

5. The method according to claim 1, wherein the first message is an RRC connection setup complete message, the RRC connection setup complete message comprises a non-access stratum NAS message, the NAS message comprises fourth indication information, and the fourth indication information is used to indicate that the type of the terminal device is the first type.

6. The method according to claim 1, wherein the first message is an RRC connection request message or an RRC connection setup complete message; and
the determining, by the access device based on the first message, that a type of the terminal device is a first type comprises:
determining, by the access device based on a format of the RRC connection request message or the RRC connection setup complete message, that the type of the terminal device is the first type.

7. The method according to claim 1, wherein the first message is an RRC connection setup complete message; and
the determining, by the access device based on the first message, that a type of the terminal device is a first type comprises:

determining, by the access device based on a format of a NAS message in the RRC connection setup complete message, that the type of the terminal device is the first type.

8. The method according to claim 6, wherein before the access device receives the first message sent by the terminal device, the method further comprises:
sending, by the access device, capability indication information to the terminal device, wherein the capability indication information is used to indicate that the access device has a capability of accessing the first core network.

9. A method of network access, comprising:
generating, by a terminal device, a first message; and
sending, by the terminal device to an access device, the first message, wherein the first message is used to indicate that the terminal device is a first-type terminal device, the first-type terminal device has a capability of accessing a first core network, the access device is connected to two different types of core networks, the two different types of core networks are a New Radio Access Technology (NR) system and a Long Term Evolution (LTE) system, and the two different types of core networks comprise the first core network;
wherein the first message is a preamble sequence; and
determining, by the access device based on the first message, that the type of the terminal device is the first type comprises:
determining, by the access device based on a correspondence between the preamble sequence and the first-type terminal device, that the type of the terminal device is the first type,
wherein the determining, by the access device based on the correspondence between the preamble sequence and the first-type terminal device, that the type of the terminal device is the first type comprises:
determining, by the access device based on a time-frequency resource of the preamble sequence and a correspondence between the time-frequency resource and the first-type terminal device, that the type of the terminal device is the first type.

10. The method according to claim 9, wherein before the generating, by a terminal device, a first message, the method further comprises:
determining, by the terminal device, a format of the first message based on a target core network to be accessed.

11. The method according to claim 9, wherein before the sending, by the terminal device, the first message to an access device, the method further comprises:
determining, by the terminal device, that the access device has a capability of accessing the first core network.

12. The method according to claim 11, wherein
before the determining, by the terminal device, that the access device has a capability of accessing the first core network, the method further comprises:

receiving, by the terminal device, a broadcast message, wherein the broadcast message comprises capability indication information, and the capability indication information is used to indicate that the access device has the capability of accessing the first core network; or
receiving, by the terminal device, random access response information, wherein the random access response information comprises the capability indication information; or
receiving, by the terminal device, a radio resource control RRC connection setup message, wherein the RRC connection setup message comprises the capability indication information.

13. An access device, comprising:
a receiver, configured to receive from a terminal device a first message used to indicate that the terminal device is a first-type terminal device, the first-type terminal device has a capability of accessing a first core network, the access device is connected to two different types of core networks, the two different types of core networks are a New Radio Access Technology (NR) system and a Long Term Evolution (LTE) system, and the two different types of core networks comprise the first core network; and
a processor, configured to determine, based on the first message, that a type of the terminal device is the first type,
determine, based on the type of the terminal device, that a target core network to be accessed by the terminal device is the first core network so that when in which the LTE system and the NR system coexist, the access device accurately connects the terminal device to the respective target core network,
wherein the first message is a preamble sequence, and the determining, based on the first message, that a type of the terminal device is a first type comprises:
determining based on a correspondence between the preamble sequence and the first-type terminal device, that the type of the terminal device is the first type.

14. The access device according to claim 13, wherein the processor is configured to determine, based on a time-frequency resource of the preamble sequence and a correspondence between the time-frequency resource and the first-type terminal device, that the type of the terminal device is the first type.

15. The access device according to claim 13, wherein the processor is configured to determine, based on a frame length, a subcarrier spacing, a cyclic prefix CP length, or a transmission time interval TTI length used to transmit the first message, that the type of the terminal device is the first type.

* * * * *

UNITED STATES PATENT AND TRADEMARK OFFICE
CERTIFICATE OF CORRECTION

PATENT NO. : 10,834,775 B2
APPLICATION NO. : 16/281815
DATED : November 10, 2020
INVENTOR(S) : Peng et al.

Page 1 of 1

It is certified that error appears in the above-identified patent and that said Letters Patent is hereby corrected as shown below:

On the Title Page

Item (56), U.S. Patent Documents, Citation 1: "2005/0075129 A1 4/2005 Kuchibholta et al." should read -- 2005/0075129 A1 4/2005 Kuchibhotla et al. --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*